US007006588B2

(12) United States Patent
Simmons et al.

(10) Patent No.: US 7,006,588 B2
(45) Date of Patent: Feb. 28, 2006

(54) SYSTEM AND METHOD FOR SYNCHRONIZATION SIGNAL DETECTION AND RECOVERY FROM FALSE TRIGGERS

(75) Inventors: Sean B. Simmons, Waterloo (CA); Zoltan Kemenczy, Mississauga (CA)

(73) Assignee: Research In Motion Limited, Waterloo (CA)

( * ) Notice: Subject to any disclaimer, the term of this patent is extended or adjusted under 35 U.S.C. 154(b) by 842 days.

(21) Appl. No.: 09/996,116

(22) Filed: Nov. 28, 2001

(65) Prior Publication Data

US 2002/0064249 A1   May 30, 2002

Related U.S. Application Data

(60) Provisional application No. 60/253,791, filed on Nov. 29, 2000.

(51) Int. Cl.
*H04L 7/00* (2006.01)
(52) U.S. Cl. ............... 375/368; 375/365; 375/357; 375/355
(58) Field of Classification Search ............ 375/354, 375/355, 356, 357, 365, 368, 316, 147
See application file for complete search history.

(56) References Cited

U.S. PATENT DOCUMENTS

| | | | | |
|---|---|---|---|---|
| 4,316,284 A | * | 2/1982 | Howson | 370/512 |
| 4,943,985 A | * | 7/1990 | Gherardi | 375/362 |
| 5,107,495 A | * | 4/1992 | Kamoi et al. | 370/510 |
| 5,303,270 A | * | 4/1994 | Fujii | 375/365 |
| 5,473,612 A | | 12/1995 | Dehner, Jr. et al. | |
| 5,809,094 A | * | 9/1998 | Masumoto et al. | 375/365 |
| 6,118,825 A | | 9/2000 | Ikeda et al. | |
| 6,587,527 B1 | * | 7/2003 | Tani et al. | 375/357 |

* cited by examiner

*Primary Examiner*—Chieh M. Fan
*Assistant Examiner*—Jason M. Perilla
(74) *Attorney, Agent, or Firm*—Jones Day; Krishna K. Pathiyal; Robert C. Liang (57) ABSTRACT

A system and method for detecting a synchronization (sync) signal in a communication signal are disclosed. A received communication signal is stored in a memory and portions thereof are read from the memory and monitored to detect the sync signal. When a detected sync signal is determined to be invalid, previously read portions of the received communication signal, preferably beginning at a portion of the received signal immediately after a start of the detected sync signal, are again read and monitored to detect the sync signal. Such reading and monitoring of previously read portions of a received signal provide for recovery from so-called false triggering based on invalid sync signals.

23 Claims, 10 Drawing Sheets

SYSTEM AND METHOD FOR SYNCHRONIZATION SIGNAL DETECTION AND RECOVERY FROM FALSE TRIGGERS

CROSS-REFERENCE TO RELATED APPLICATION

This application claims priority from U.S. Provisional Application Ser. No. 60/253,791, filed on Nov. 29, 2000. The complete disclosure of this provisional application, including drawings, is hereby incorporated into this application by reference.

BACKGROUND OF THE INVENTION

1. Field of the Invention

This invention relates generally to communication signal receivers and in particular to synchronization detection in signal receivers.

2. Description of the State of the Art

In some known communication systems, an initial data pattern or portion of a received signal is used by receivers to control decoding or other processing of the remainder of the signal. Therefore, successful decoding or processing of a signal is dependent upon accurate reception of the initial data pattern.

This type of initial data pattern may be referred to generally as a synchronization (sync) signal. In order to properly process a received signal, the sync signal must be received and decoded correctly. However, a sync signal detection scheme may from time to time erroneously detect a sync signal, resulting in increased data processing errors, since the erroneously detected sync signal is not a valid sync signal. Known receivers do not provide effective mechanisms for recovering from erroneous sync signal detections, commonly called false triggering.

Therefore, there remains a need for a system and method for detecting a sync signal, which provide for reliable and effective recovery from false triggering.

SUMMARY OF THE INVENTION

According to an aspect of the invention, a system for detecting a sync signal in a communication signal comprises a memory configured to store consecutive portions of a received communication signal, and a sync signal detector configured to read the consecutive stored portions of the received communication signal from the memory, monitor the read portions of the received signal to detect the sync signal, and determine whether or not the sync signal detected in the stored portions of the received signal is invalid, wherein the sync signal detector reads and monitors previously read portions of the received signal from the memory when the detected sync signal is invalid.

A related method for detecting a sync signal in a communication signal according to another aspect of the invention, comprises the steps of storing consecutive portions of a received communication signal in a memory, reading the consecutive stored portions of the received communication signal from the memory, monitoring the read portions of the received signal to detect the sync signal, determining whether or not the sync signal detected in the stored portions of the received signal is invalid, and if the detected sync signal is invalid, then repeating the steps of reading and monitoring for previously read portions of the received signal.

In a further embodiment of the invention, a system for detecting a sync signal in a communication signal comprises means for storing consecutive portions of a received communication signal, and means for detecting the sync signal, by reading the consecutive stored portions of the received communication signal from the means for storing, monitoring the read portions of the received signal to detect the sync signal, and determining whether or not the sync signal detected in the stored portions of the received signal is invalid, wherein the means for detecting reads and monitors previously read portions of the received signal from the means for storing when the detected sync signal is invalid.

According to a further aspect of the invention, a computer readable medium containing instructions for implementing a method for detecting a sync signal in a communication signal, the method comprising the steps of storing consecutive portions of a received communication signal in a memory, reading the consecutive stored portions of the received communication signal from the memory, monitoring the read portions of the received signal to detect the sync signal, determining whether or not the sync signal detected in the stored portions of the received signal is invalid, and if the detected sync signal is invalid, then repeating the steps of reading and monitoring for previously read portions of the received signal.

A wireless communication device in accordance with a still further aspect of the invention comprises a transceiver configured to transmit and receive communication signals, and a digital signal processor (DSP) operatively coupled to the transceiver, the DSP comprising computer software code for detecting a sync signal in a communication signal, by performing the functions of storing consecutive portions of a received communication signal in a memory, reading the consecutive stored portions of the received communication signal from the memory, monitoring the read portions of the received signal to detect the sync signal, determining whether or not the sync signal detected in the stored portions of the received signal is invalid, and if the detected sync signal is invalid, then repeating the steps of reading and monitoring for previously read portions of the received signal.

Further features of the invention will be described or will become apparent in the course of the following detailed description.

BRIEF DESCRIPTION OF THE DRAWINGS

For a better understanding of the present invention, and to show more clearly how it can be carried into effect, reference will now be made, by way of example only, to the accompanying drawings in which.

DETAILED DESCRIPTION OF PREFERRED EMBODIMENTS

Figure 1:
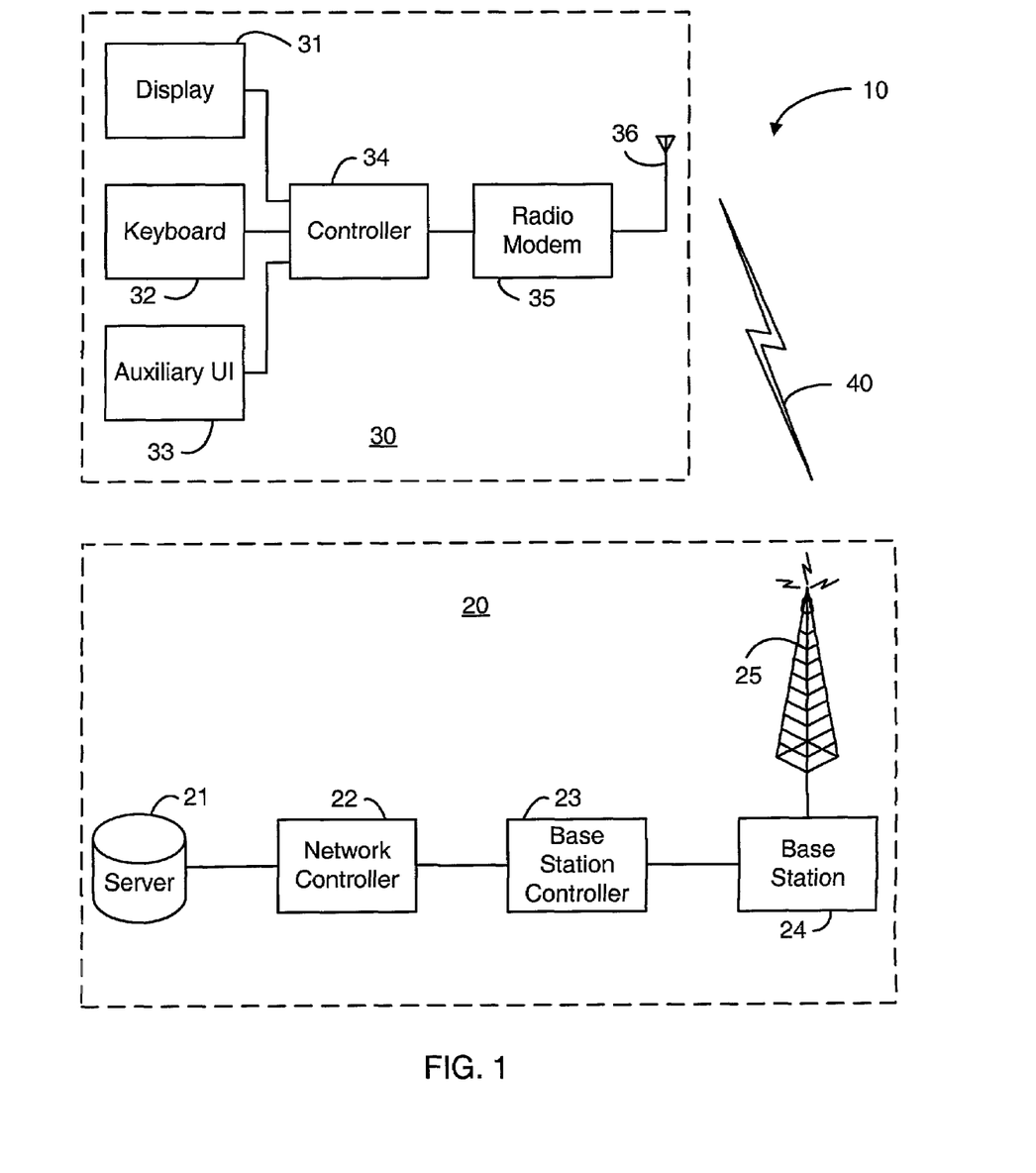
FIG. 1 is a block diagram of a communication system.

To aid the reader in better understanding how the present invention may be utilized, we provide some introductory information on the functioning of a wireless communication network. Referring first to FIG. 1, a block diagram of a communication system is shown generally as 10. System 10 comprises network 20 and mobile communication device 30, which communicate via wireless link 40.

Network 20 comprises a server 21, a network controller 22, a base station controller 23, a base station 24 and an antenna 25.

Server 21 may be any component or system connected within or to network 20. For example, server 21 may be a service provider system, which provides wireless communication services to device 30 and stores data required for routing a communication signal to device 30. Server 21 may also be a gateway to other networks, including but in no way limited to a telephone network, a local area network, or a wide area network such as the Internet. Those skilled in the art to which the present application pertains will appreciate that although only a single server 21 is shown in FIG. 1 a typical network 20 may include multiple servers 21.

Network controller 22 handles routing of communication signals through network 20 to device 30. In the context of a packet switched communication network, network controller 22 must determine a location or address of a device 30 and route packets to a device 30 through one or more routers or switches (not shown) and eventually to a base station 24 serving a network coverage area in which device 30 is currently located.

Base station 24, its associated controller 23 and antenna 25 provide wireless network coverage for a particular coverage area commonly referred to as a "cell". Base station 24 transmits communication signals to and receives communication signals from mobile devices 30 within its cell via antenna 25. Base station 24 normally performs such functions as modulation and possibly encoding and/or encryption of signals to be transmitted to a device 30 in accordance with communication protocols and parameters, under the control of base station controller 23. Base station 24 similarly demodulates and possibly decodes and decrypts if necessary any communication signals received from a device 30 within its cell. Communication protocols and parameters may vary between different networks 20. For example, one network may employ a different modulation scheme and operate at different frequencies than other networks.

An actual wireless network 20 such as the Mobitex™ network or DataTAC™ network for example may include a plurality of cells, each served by a distinct base station controller 23, and base station 24. Base station controllers 23 and base stations 24 may be connected by multiple switches and routers (not shown), and controlled by multiple network controllers 22, only one of which is shown in FIG. 1. Similarly, network 20 may also include a plurality of servers 21, including for example storage, routing, processing and gateway components.

Mobile device 30 typically has a display 31, a keyboard 32, and possibly one or more auxiliary user interfaces (UIs) such as 33, connected to a controller 34, which in turn is connected to a radio modem 35 and an antenna 36.

Mobile device 30 sends communication signals to and receives communication signals from network 20 over wireless link 40 via antenna 36. Radio modem 35 performs functions similar to those of base station 24, including for example modulation/demodulation. Radio modem 35 may also provide encoding/decoding and encryption/decryption.

In most modern communication devices 30, controller 34 is a central processing unit (CPU) running operating system software which is stored in a device memory component (not shown). Controller 34 controls overall operation of device 30, whereas signal processing operations associated with communication functions are typically performed in modem 35. Controller 34 interfaces with display 31 to display received information, stored information, user inputs and the like. Keyboard 32, which may be a telephone type keypad or full alphanumeric keyboard, may also utilize auxiliary user interface components 33. Keyboard 32 is normally provided on mobile communication devices for entering data for storage on device 30, information for transmission from device 30 to network 20, a telephone number to place a call from device 30, commands to be executed on device 30, and possibly other or different user inputs.

Device 30 may consist of a single unit, such as a data communication device, a cellular telephone, a multiple-function communication device with data and voice communication capabilities for example, a personal digital assistant (PDA) enabled for wireless communication, or a computer incorporating an internal modem. Device 30 may also be a multiple-module unit, comprising a plurality of separate components, including but in no way limited to a computer or other device connected to a wireless modem. For example, modem 35 and antenna 36 may be implemented as a radio modem unit that may be inserted into a port on a laptop computer. Although only a single device 30 is shown in FIG. 1, it will be obvious to those skilled in the art to which this application pertains that many devices 30, including different types of devices 30, may be active or operable within a wireless communication network 20 at any time.

Figure 2:
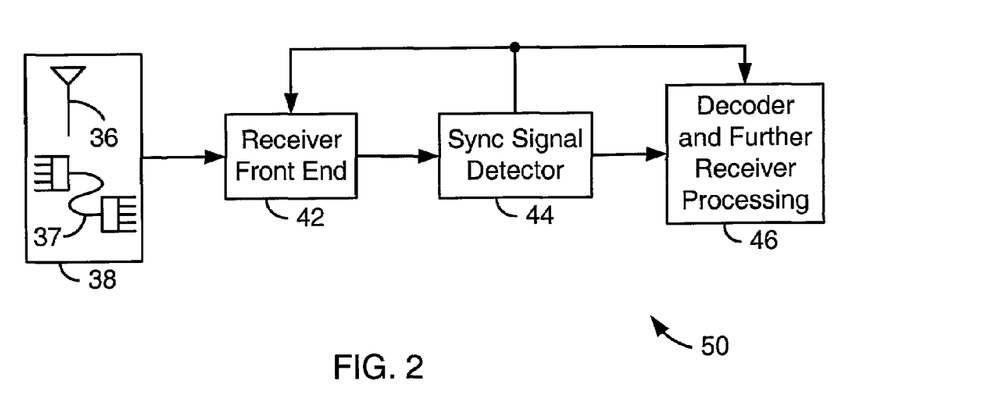
FIG. 2 is a block diagram of a communication signal receiver.

Referring now to FIG. 2, a block diagram of a communication signal receiver 50 is shown. A signal received at a receiving element 38, which may be an antenna 36 as described above when the invention is implemented in a wireless communication device 30, or possibly a wired connection 37, is processed in a receiver front end module 42, which may include such functions as amplification, filtering and analog to digital conversion. Sync signal detector 44 operates to detect a sync signal in a received signal, as discussed further below, and provides synchronization and control signals to the receiver front end 42 and a decoder and receiver processing module designated generally in FIG. 2 by numeral 46. The module 46 may for example include symbol detection, deinterleaving, decoding, error detection, error correction and other such signal processing functions. In many modern receivers, the sync signal detector 44 and processing module 46 would be implemented as a digital signal processor (DSP). When implemented in a device such as shown in FIG. 1, the receiver front end 42, detector 44 and at least some of the components in the decoder and further processing module 46 would be part of the radio modem 35.

Figure 3:
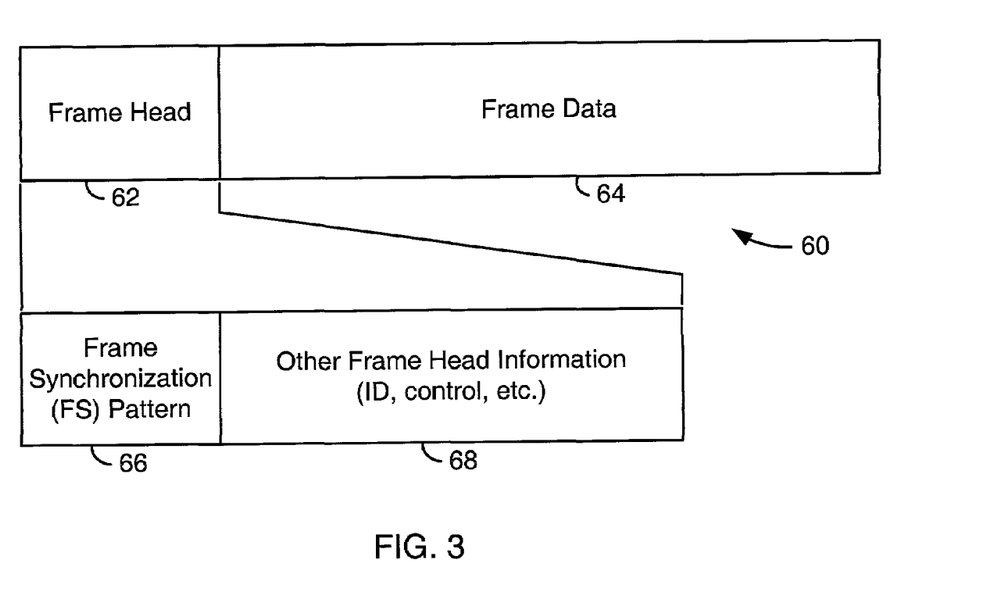
FIG. 3 is a data structure diagram which represents a general communication signal frame structure.

FIG. 3 is a data structure diagram which represents a general communication signal frame structure. The frame structure is shown in FIG. 3 merely as an illustrative example of one type of communication signal including a sync signal. The invention is in no way limited thereto, and may be applied in any communication signal receiver configured to receive communication signals having sync signals.

A frame 60 normally has a frame head 62 and data portion 64. As shown, the frame head includes a sync signal, in the form of a frame synchronization (FS) pattern 66, in addition to other frame head information 68, such as identification (ID) and control information. In a packet-based communication system, multiple packets may be grouped together into a frame, such that the frame data portion 64 includes data from many different packets.

The FS pattern 66 is a data or bit pattern that will ideally only appear in a communication signal when an FS pattern is actually being transmitted and provides for determination of frame timing and other synchronization information by a receiver. The additional frame head information 68 may for example designate a particular decoding process to be used in a receiver. Thus, the frame head contains information required for successful reception of a transmitted frame by a receiver.

The operation of a typical sync signal detector will now be described in further detail in the context of a communication signal comprising frames such as frame 60. However, it should be appreciated that although described with reference to FS patterns, the invention may be applied to communication signal receivers which are configured to include other types of sync signals. An FS pattern is merely an illustrative example of a sync signal.

Figure 4:
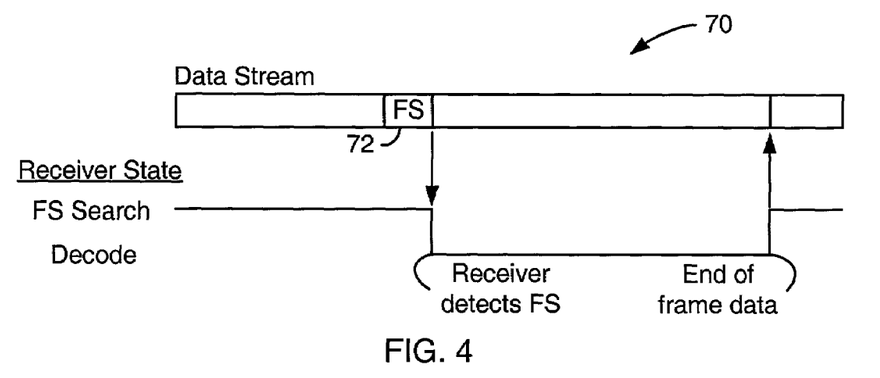
FIG. 4 is a timing diagram illustrating the operation of a known sync signal detector.

FIG. 4 is a timing diagram illustrating the operation of a sync signal detector in accordance with a conventional detection scheme. A receiver such as receiver 50 may have two states, FS search and decode, dependent upon the operation of the sync signal detector 44, which in this example would be an FS detector. As shown in the Figure, the receiver 50 remains in the FS search state, during which the detector 44 is monitoring the received data stream 70 for an FS pattern, referred to hereinafter as simply an FS. Upon detection of the FS 72 in the data stream 70, the receiver is synchronized, enters the decode state and decodes a complete frame of data. When decoding of the frame is completed, the receiver reverts back to the FS search state.

Figure 5:
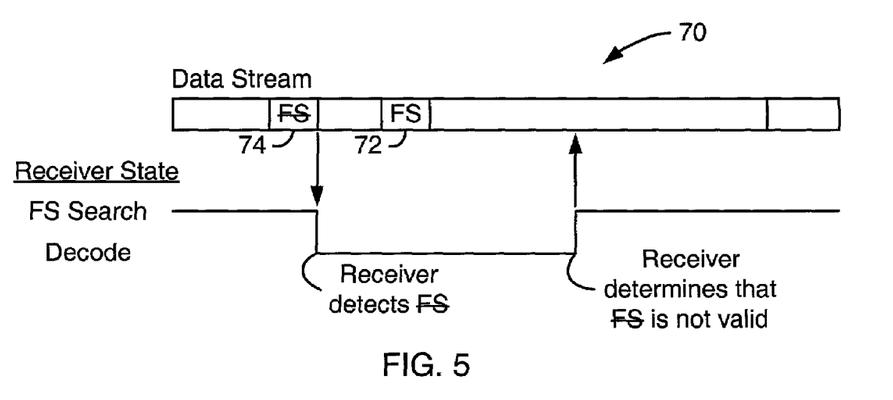
FIG. 5 is a timing diagram which shows false triggering of a sync signal detector.

One problem inherent in such conventional FS detection schemes is illustrated in FIG. 5. FIG. 5 is a timing diagram which shows false triggering of a sync signal detector. If a portion of data stream 70 is erroneously detected as an FS, as shown at 74, the receiver will incorrectly synchronize and attempt to decode the received data based on the false or invalid 74. Further processing of such erroneously decoded data in the receiver will indicate that the detected 74 must be a false FS, such that after time t, the receiver reverts back to FS search mode. For example, a bit error rate (BER) or symbol error rate (SER) of the decoded data could be monitored. Alternatively, the frame head 62 of the frame 60 may include information that may be used to determine whether or not a detected FS is a valid sync signal. In some known communication systems such as the above example Mobitex and DataTAC systems, a frame head includes Cyclical Redundancy Check (CRC) data which may be used to determine whether or not frame head information has been decoded properly. If the BER or SER exceeds a predetermined error rate threshold, or if the decoded frame head does not pass the CRC, then the receiver determines that a detected FS 74 must be false, as known in the art. However, if a valid FS 72 occurs in the data stream during time t, the FS detector in such a receiver cannot detect the valid FS 72 and any data received before the next valid FS will be lost.

Although referred to as an invalid or false FS, FS 74 could possibly be a valid sync signal sent from other than an intended transmitter. For example, in a mobile communication system, a mobile communication device within the service area of a first base station may receive signals transmitted by not only the first base station but also a second base station serving an adjacent area, particularly when the device is near the limits of the first service area. Within the first service area, transmissions from the first base station should be on average stronger than those from the second base station. At any instant in time however, the transmissions from the second base station may be stronger. If the second base station transmits an FS at such a time, then the mobile station may detect the FS. Even though the detected FS is valid, the receiver may not properly process the remainder of a received signal, since the FS was not received from the expected transmitter, the first base station. In such a situation, the receiver would operate as illustrated in FIG. 5 to detect the false triggering of the FS detector. Thus, in the remainder of this description and in the appended claims, the terms "invalid" or "false", in the context of an FS, sync signal or sync pattern, includes both invalid and improperly received but valid FSs, sync signals and patterns.

Figure 6:
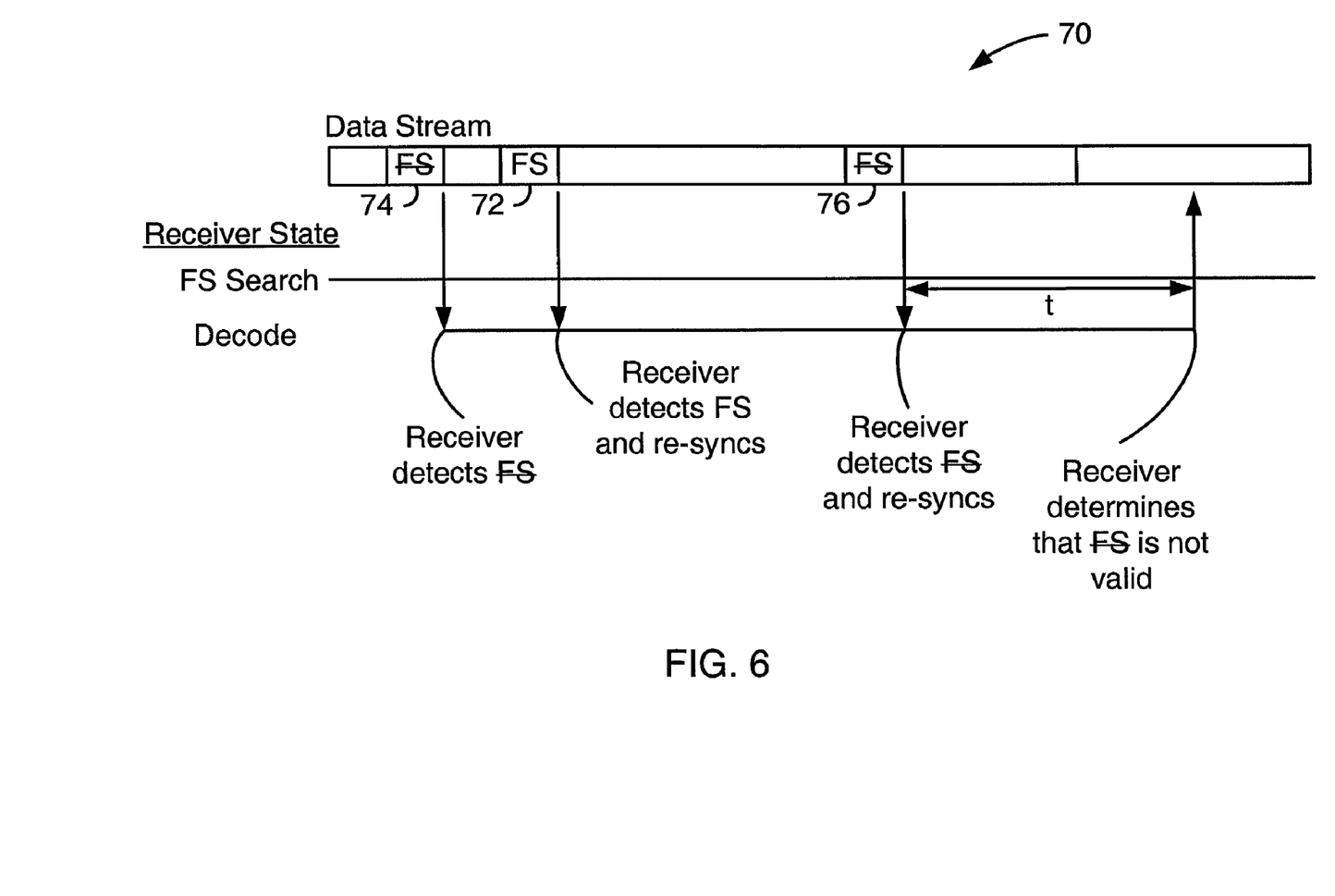
FIG. 6 is a timing diagram showing false triggering of a sync signal detector with a continuous sync signal search function.

One solution to the above problem of false triggering of a sync signal detector would be to design a detector 44 and receiver processing module 46 such that the sync signal search function runs continuously, even when the receiver is decoding the data stream. This technique is illustrated in FIG. 6, which is a timing diagram showing false triggering of an FS detector with a continuous FS search function. The problems caused by erroneous detection of the invalid FS 74 would be remedied in that the valid FS 72 will be detected and the receiver will be re-synchronized based thereon. However, this solution overcomes the false triggering problem only when the erroneous FS detection occurs outside the frame of data to be decoded following a valid FS 72. As shown in FIG. 6, if invalid FS 76 is detected as an FS, the receiver is re-synchronized based on the detected invalid FS 76 and data decoding and further processing will be corrupted.

Another solution to the problem of false FS detector triggering would be to choose a better bit pattern for an FS which is less likely to occur in data streams. This approach holds merit for new communication systems, but for existing systems, FS patterns have been set and are not easily changed.

A sync signal detector itself might also be designed to be more selective to reduce the number of false triggers. The shortcomings of such an approach will be discussed with reference to FIGS. 7–9, which are histograms of sync signal detector outputs and thresholds which may be used in sync signal detection. In these Figures, curve 78 represents a distribution of the outputs of a sync signal detector when a valid sync signal is not actually received, and curve 80 represents the outputs of the sync signal detector when a valid sync signal is actually received. As will be apparent to those skilled in the art, sync signal detectors typically perform correlations between received data and an expected sync signal or pattern, such as the FS pattern described above, to produce a probability output indicative of the likelihood that a portion of received data is a valid sync signal. A sync signal is detected when the output of the phase detector exceeds a threshold probability value.

Figure 7:
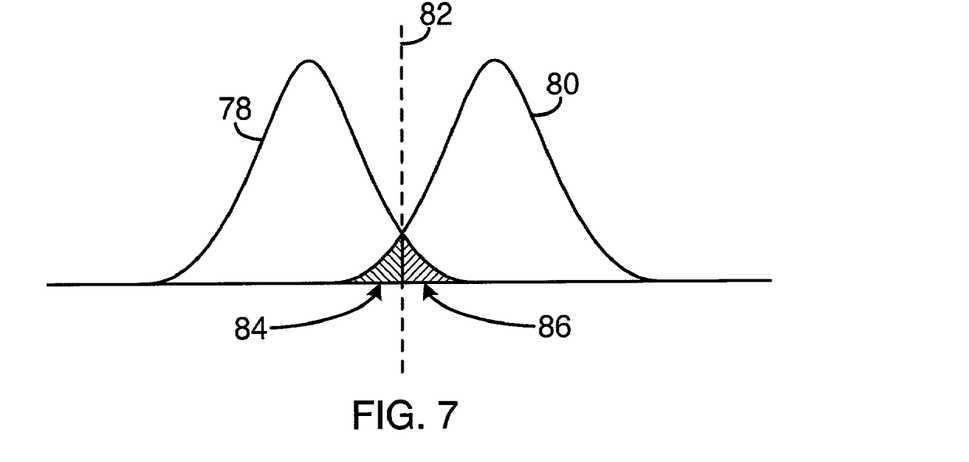
FIGS. 7–9 are histograms of sync signal detector outputs and thresholds used in sync signal detection.
Figure 8:
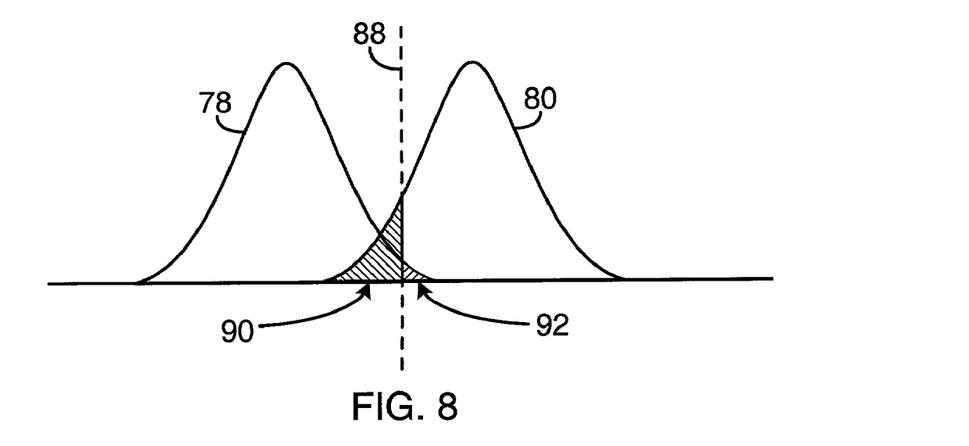

FIG. 7 illustrates a realistic situation, in which the distributions partially overlap. The threshold 82 trades off missed detections of valid sync signals, represented by shaded area 84, against false triggering caused by erroneous detections of invalid sync signals, represented by area 86. A more selective sync signal detector would reduce false triggering by essentially using a higher threshold such as threshold 88 shown in FIG. 8. Comparing the false trigger and missed detection areas in FIGS. 7 and 8, false triggering indicated by areas 86 and 92 is reduced by using the higher threshold 88 instead of threshold 82, but at the expense of increasing the number of valid sync signals not detected, indicated by areas 84 and 90. Thus, false triggering will cause fewer problems for a receiver using the sync signal detection scheme of FIG. 8, but more data may be lost as a result of more valid sync signals not being detected. Conventional receiver designs attempt to alleviate false triggering by employing a more selective sync signal detector such as represented in FIG. 8. However, more selective sync signal detectors are by their nature less sensitive and therefore fail to detect some valid sync signals.

In contrast to conventional detectors and detection schemes, according to an aspect of the instant invention, the sensitivity of sync signal detection is increased, such that the likelihood of failing to detect a valid sync signal is very low. This improved detection of valid sync signals also results in a higher number of false triggers. The invention is therefore contrary to the teachings of the prior art, in which sync signal detection is designed to minimize false triggers.

Figure 9:
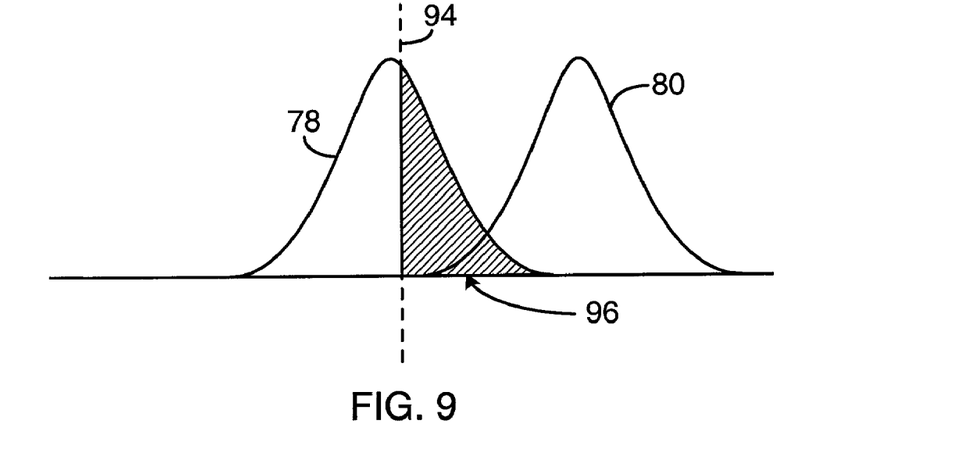

The distributions shown in FIG. 9 illustrate this aspect of the invention. A threshold value 94 is set significantly lower than those used in the sync signal detection schemes shown in FIGS. 7 and 8. Sync signal detectors and detection methods in accordance with the invention may result in more false triggers, represented by the shaded area 96 in FIG. 9, but should successfully detect virtually all valid sync signals. Processing operations performed upon determination that a detected sync signal is invalid alleviate the potential problems associated with this higher incidence of false triggering, as will become apparent from the following description.

Figures 10, 11:
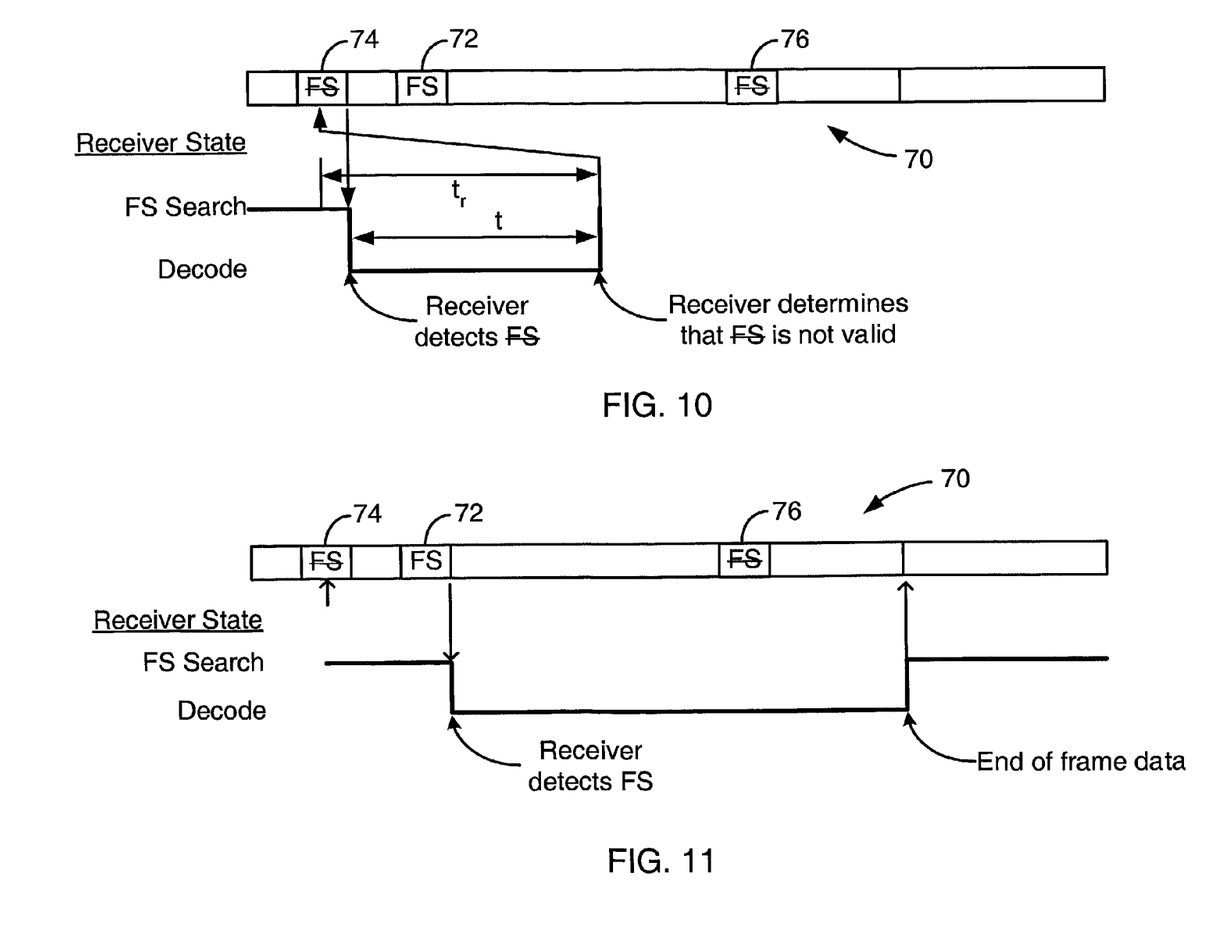
FIGS. 10 and 11 are timing diagrams illustrating the operation of a sync signal detector in accordance with an illustrative embodiment of the invention.

Sync signal detection in accordance with the invention will now be described with reference to FIGS. 10 and 11, using the above example of an FS as a sync signal. FIGS. 10 and 11 are timing diagrams illustrating the operation of a sync signal detector in accordance with an illustrative embodiment of the invention. As shown in these Figures, a receiver incorporating the invention preferably has two states, FS search and decode. A data stream 70 includes data patterns 74 and 76, which are similar to the FS 72 and would be interpreted as FS patterns by an FS detector when in FS search mode. Upon detection of the pattern FS 74 and interpretation thereof as a valid FS by an FS detector, the receiver would sync and enter the decode state to begin decoding data based on the invalid FS. As in prior art arrangements, after time t, the receiver determines that the detected FS 74 must be invalid and reverts to the FS search state.

According to the invention however, the FS search function is resumed at a point in the data stream 70 preceding the point of false triggering. The inventive FS detector and detection scheme effectively "rewind" the data stream 70 to resume searching for an FS at or before the point in the data stream where the false trigger occurred. Storage of a portion of the received signal corresponding to a duration of at least time t is therefore required. An FS detector according to the invention is thus preferably implemented to operate on digital signals. When a detected FS is determined to be invalid, the data stream is rewound to a point at or before the false trigger, but after the beginning of the previously detected invalid FS pattern, to thereby avoid re-detection of the same invalid FS pattern.

Preferably, an FS detector or detection method implementing the invention rewinds the data stream to resume the FS search function at a digital bit or sample immediately following the start of the detected invalid FS 74 that caused the false trigger. For example, if $t_r$ is defined as a rewind time as shown in FIG. 10, $t_p$ is defined as a time length of the FS pattern, and $t_s$ is a bit or sample period, then $t \leq t_r < (t+t_p)$, and $t_r$ is preferably greater than or equal to $(t+t_p-t_s)$. Since both t and $t_p$ are known or can be calculated for any particular network or receiver, the memory space required to store an amount of data spanning the rewind time $t_r$ is easily determined. In a contemplated embodiment of the invention in a receiver operating on the Mobitex wireless communication system, t is approximately 30 ms, but sufficient memory space to store more of the received signal, such as 50 ms for example, is allocated for rewind function processing. In terms of digital samples of a received signal comprising data stream 70, which samples may be one or more bits, if a receiver must process n samples to determine that a detected FS is invalid, and the FS is $n_s$ samples in length, then the data stream is rewound by between n and $(n+n_s-1)$ samples when a detected FS is determined to be invalid. The FS search is preferably resumed at a sample immediately following the start of a detected invalid FS, such that the data stream is preferably rewound by $(n+n_s-1)$ samples. As described in further detail below, the rewinding of a data stream may be accomplished by reading previously stored samples from a memory such as a buffer.

After the data stream has been rewound, the FS search resumes and the sync signal detector in the receiver monitors the data stream 70 for the next possible FS. If another invalid FS (not shown) is detected, the receiver syncs and enters the decode state, determines that the detected FS is invalid, the above rewind operation is again executed and the receiver reverts to the FS search state. When a valid FS 72 is detected, the receiver synchronizes and decodes the received data stream. Even if the block of data to be decoded includes further data patterns similar to the FS such as 76, since the receiver is in the decode state, the invalid FS 76 will not be detected. The above problems caused by false triggering are thus overcome in the invention.

Figure 12:
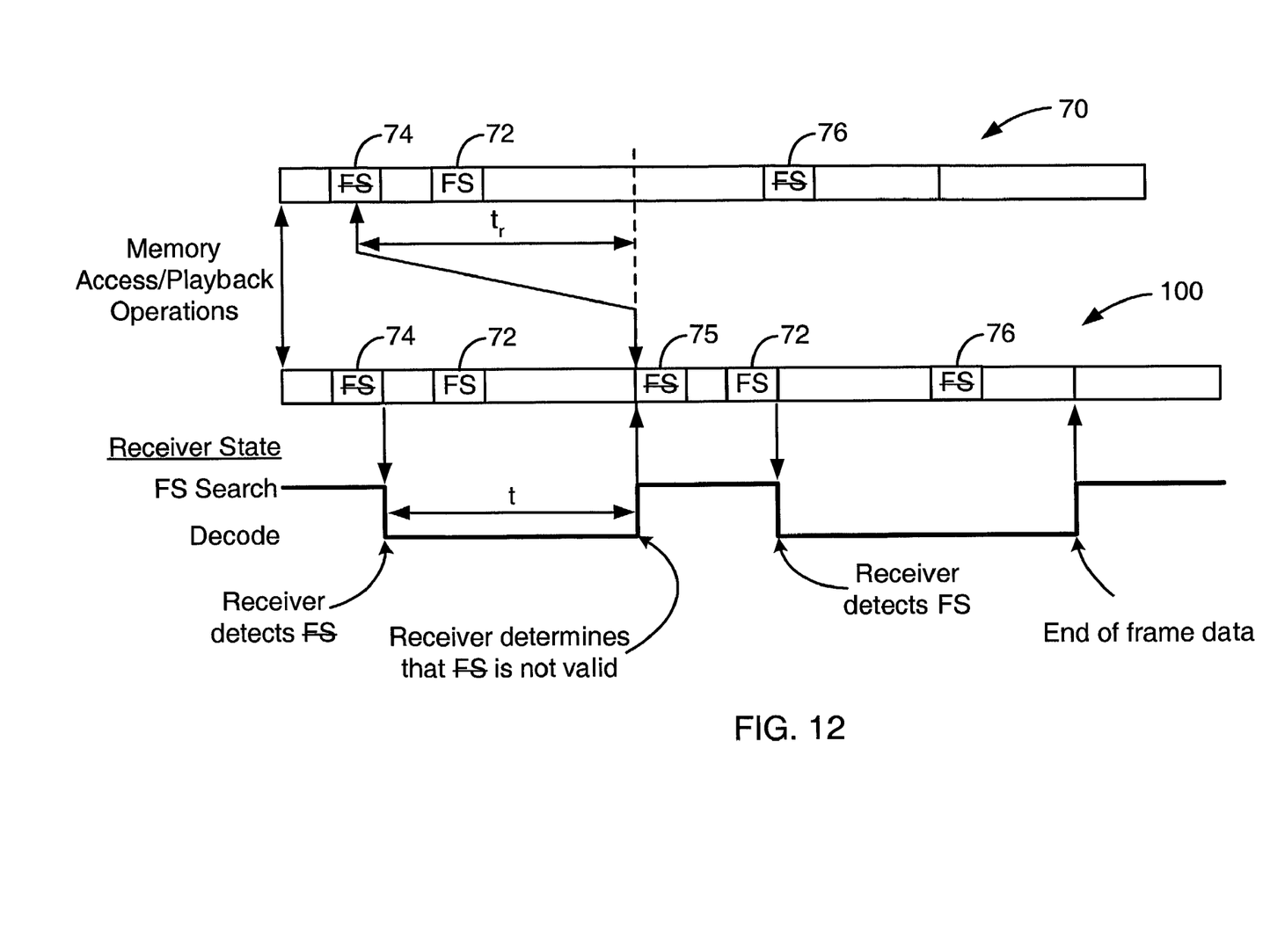
FIG. 12 is a timing diagram showing a real-time representation of the sync signal detection operation shown in FIGS. 10 and 11.

FIGS. 10 and 11 illustrate FS detection in accordance with the invention, but timing between these Figures is not continuous. FIG. 12 is a timing diagram showing a real-time representation of the sync signal detection operation shown in FIGS. 10 and 11. All of the operations in FIGS. 10 and 11 are included in FIG. 12, although the relative timing of receiver state transitions is more clearly represented in FIG. 12.

The data stream 70 is stored in a memory and accessed during FS detection to generate the data stream 100, which is processed for FS detection. As will be apparent from FIG. 12, when the receiver determines that a detected FS is invalid, the FS search function is resumed at a point in the received data stream before the false trigger, preferably immediately after the start of a detected invalid FS. Conceptually, a rewind operation is performed on the data stream upon determination that a detected FS is invalid. In one implementation of the invention, data stored in the memory that was processed during the time $t_r$ is again read from the memory and monitored for a valid FS. When FS 74 is determined to be invalid after time t, a portion of data stream 70 corresponding to the time $t_r$ and including a portion 75 of the invalid FS 74 is repeated in data stream 100. As also indicated in FIG. 12, repetition of data from stored data stream 70 in data stream 100 may be accomplished by simply re-accessing a number of previously accessed memory locations.

When a rewind operation is performed, it will be apparent that the data stream 100 lags the data stream 70 by approximately $t_r$. However, in preferred embodiments of the invention, a receiver is configured to process data at a rate faster than a data rate of the data stream 70 when a rewind operation is performed. This allows a receiver to "catch up" to the incoming data stream 70, while providing for rewinding of the data stream when a detected sync signal is determined to be invalid. Such an arrangement also prevents loss of data in the data stream 70 if more than one rewind operation must be performed during reception of a communication signal.

Figure 13:
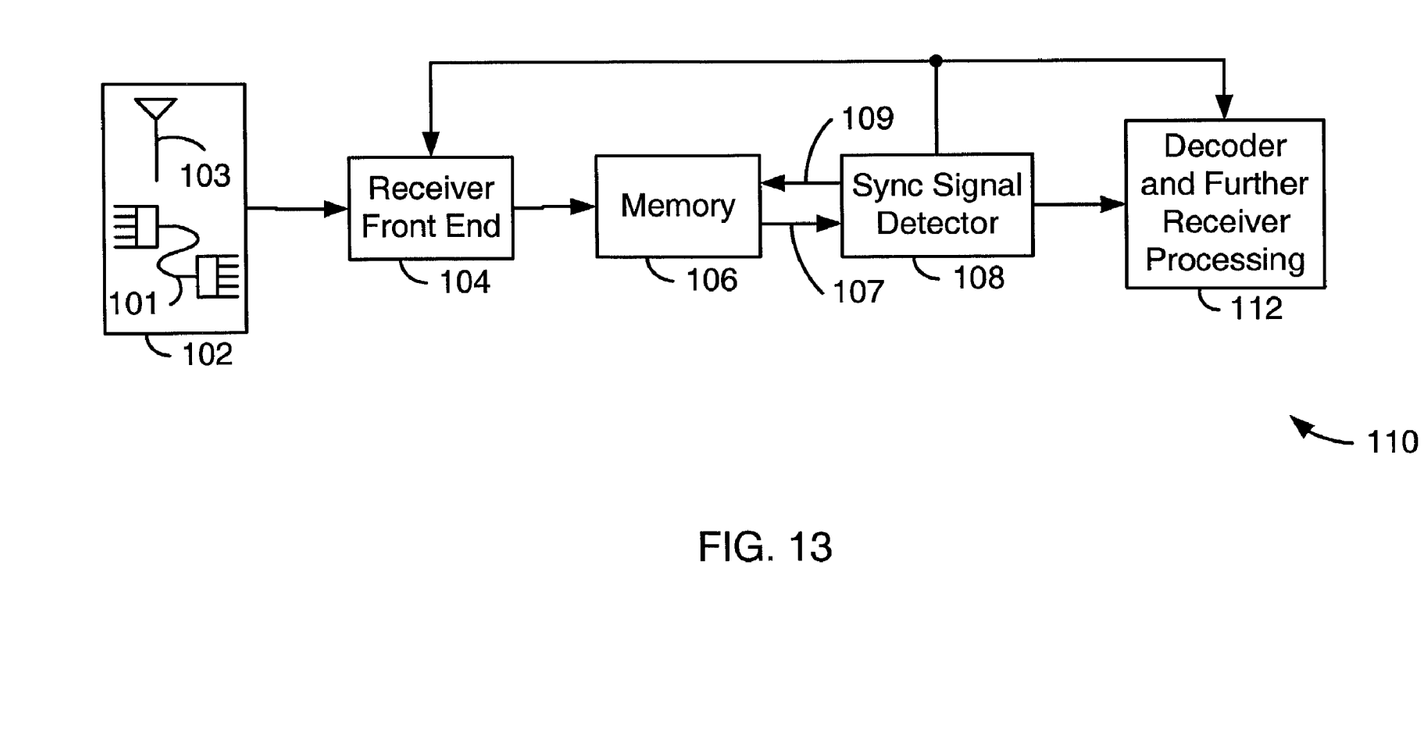
FIG. 13 is a block diagram of a general receiver architecture implementing a sync signal detector according to an aspect of the invention.

FIG. 13 is a block diagram of a general receiver architecture implementing a sync signal detector according to an aspect of the invention. In FIG. 13, a receiver 110 includes a signal receiving element 102, possibly an antenna 103 for wireless communication systems or a wired connection 101 for wired communication systems, which receives communication signals and inputs received signals to a receiver front end module 104. The receiver front end module 104 may perform such functions as amplification, filtering and analog to digital conversion, and thereby preferably provides at its output a digital signal representative of a received communication signal. The receiving element 102 and front end module 104 may be substantially the same as receiving element 38 and front end module 42. In order to provide for sync signal detection in accordance with the present invention, the receiver 110 also includes a memory 106 which is of sufficient size to store at least an amount of data corresponding to rewind time $t_r$, or where digital signals are stored in the memory 106, at least a number of samples $n_r$ which are re-read from a memory as described above. The memory 106 may be any known digital storage element, for example a random access memory (RAM) or flash memory, to which data may be written. Sync signal detector 108 operates in conjunction with memory 106 to detect a sync signal such as an FS in the received signal stored in memory 106.

The memory access/playback operations indicated in FIG. 12 are executed between the memory 106 and detector 108. Stored portions of a received signal, preferably digital samples, are provided by the memory 106 to the detector 108 on a data output 107, whereas a memory address or pointer may be provided to the memory 106 by the detector 108 on an address input 109. This arrangement allows the detector 108 to control the read location of the memory 106 and thus the portion of the received signal that is provided by the memory 106. As such, a received data stream can effectively be rewound by the detector 108 when an invalid sync signal is detected.

As described above, the memory 106 is preferably of sufficient size to store at least a portion of the received signal corresponding to a time $t_r$ or number of samples $n_r$ by which a received signal is rewound. However, in order to prevent loss of any received data, processing delays in the sync signal detector 108 are preferably also compensated by providing for additional storage in the memory 106. Referring back to FIG. 12 for example, if the memory 106 stores only a portion of the received data stream 70 corresponding to the rewind time $t_r$, then FS search processing must be instantaneous in order to process the oldest data in the memory 106 before it is overwritten by new data in the data stream 70. Therefore, it is preferable that the memory 106 has sufficient space to store at least a portion of a received signal corresponding to rewind time or a number of rewind samples plus an appropriate additional time or number of samples associated with processing time of the sync signal detector. In the above example of the Mobitex communication system, where t is approximately 30 ms, the storage of 50 ms of the received signal in the memory 106 is sufficient to accommodate both the rewind function and processing delays. The invention is in no way limited to these particular storage characteristics for the memory 106. For different communication systems, sync signals and desired rewind operations, different memory requirements may be established and implemented.

As described above, a receiver 110 is preferably configured to process data at a rate faster than a data rate of incoming data when a rewind operation is performed. Such receivers are able to "catch up" in an incoming data stream relatively quickly following a rewind operation, so that the memory 106 need only store a portion of a received signal associated with a single rewind operation. The faster processing rate is preferably chosen based upon an expected maximum incoming data rate such that a receiver would catch up following a rewind operation before another rewind operation would be required, i.e. before a sync signal detected following a rewind operation could be determined to be invalid. This allows re-use of space in the memory 106 without loss of any data and thus reduces the required size of the memory 106. However, if sufficient space is provided in the memory 106 to store incoming data for a maximum number of allowed rewind operations for any incoming signal, then this faster processing would not be necessary. As those skilled in the art will appreciate, a receiver would revert back to a normal processing rate once it catches up to an incoming data stream to avoid memory 106 underflow or similar conditions.

The module 112, like the module 46 in FIG. 2, may include symbol detection, deinterleaving, decoding, error detection, error correction and other such signal processing functions. In a preferred embodiments of the invention, at least the memory 106 and detector 108 are implemented as digital components and may for example be implemented in a DSP.

The operation of a preferred implementation of the sync signal detector 108 and memory 106 as digital components will now be described in further detail with reference to both FIG. 12 and FIG. 13. The sync signal detector 108 reads digital samples of a received signal, each of which may one or more bits in length, from the memory 106. Each sample or possibly blocks of samples having a length equal to the length of an FS are then compared or correlated with the known FS pattern to detect any potential FS patterns in the received signal. Any FS detection algorithm may be used for this initial FS detection. As samples are read from the memory 106, the detector 108 preferably maintains a memory address or pointer to a first sample of a stored portion of the received signal representing a potential FS that is currently being processed by the sync signal detector. For example, if an FS pattern has a length of k samples, each location in the memory 106 stores a single sample, and a memory address or pointer from which a stored sample was most recently read has a value of m, then the detector 108 preferably stores and updates both m and [m−(k−1)], each time a sample is read from the memory 106. The value m allows the detector 108 to determine the next memory location to be read, whereas [m−(k−1)] allows the detector to determine which memory location should be read when a rewind operation is to be executed. For further clarity, when FS 74 is detected, m corresponds to the memory location which stores the last sample in FS 74, and [m−(k−1)] corresponds to the memory location in which the first sample in FS 74 is stored.

Therefore, when the receiver syncs upon detection of FS 74, the current memory pointer or address value m is used to determine the next memory location, at which decoding and further processing of the received signal should proceed, immediately following the detected FS 74. Subsequent stored samples in the memory 106 may then be read by the detector 108 and passed to the module 112, or the value m may instead be passed to the module 112 and then used by the module 112 to calculate addresses or pointers to access the memory 106.

If a detected FS is then determined to be invalid, when a frame head does not pass a CRC as described above for example, then decoding and any other processing being performed in the module 112 is discontinued and the detector 108 uses [m−(k−1)] to determine at which memory location or point in the received signal the FS search should resume. Since a valid FS may begin at a sample immediately following the first sample of a detected FS that is determined to be invalid FS, the detector 108 preferably resumes the FS search process at this next sample, corresponding to an address or pointer value of [m−(k−1)+1] in the above example. The FS search process then continues until the FS 72 is detected, at which time the receiver syncs and begins decoding the received signal. The address or pointer values m and [m−(k−1)] now correspond to the first and last samples of the FS 72. As above, m is used to determine where processing of the received signal should begin, and if necessary, [m−(k−1)] is used to determine where FS search operations should resume if the detected FS 72 were determined to be invalid.

It should be appreciated that sync signal detection schemes according to the invention could be implemented in receiver architectures other than the example receiver 110. For example, the memory 106 could be integrated with the receiver front end 104, the sync signal detector 108 or the decoder and receiver processing module 112. The memory 106 could also be associated with other components, such as the controller 34 in FIG. 1 for example, in a communication device in which the receiver is implemented. Provided that at least the receiver front end 104 can write to the memory 106 and the sync signal detector 108 can read from memory 106, the location of the memory 106 and its association with other components may be different in different receivers. In many practical applications of the present invention, the memory 106 may comprise a portion of storage space in a common memory unit that is shared between processing modules of the receiver. Whether implemented in a shared or dedicated memory element, the memory 106 may be configured for example as a circular queue in which the oldest stored samples of the received signal are overwritten by new samples. As will be apparent to those skilled in the art, the memory locations to which the received signal samples are stored may or may not necessarily have sequential addresses, but should be "logically" sequential to ensure that the signal samples are read from the memory in the same order in which they were stored to the memory. In a linked list data structure for example, the samples may be stored to non-contiguous memory locations, but would be readable in the correct order.

Figure 14:
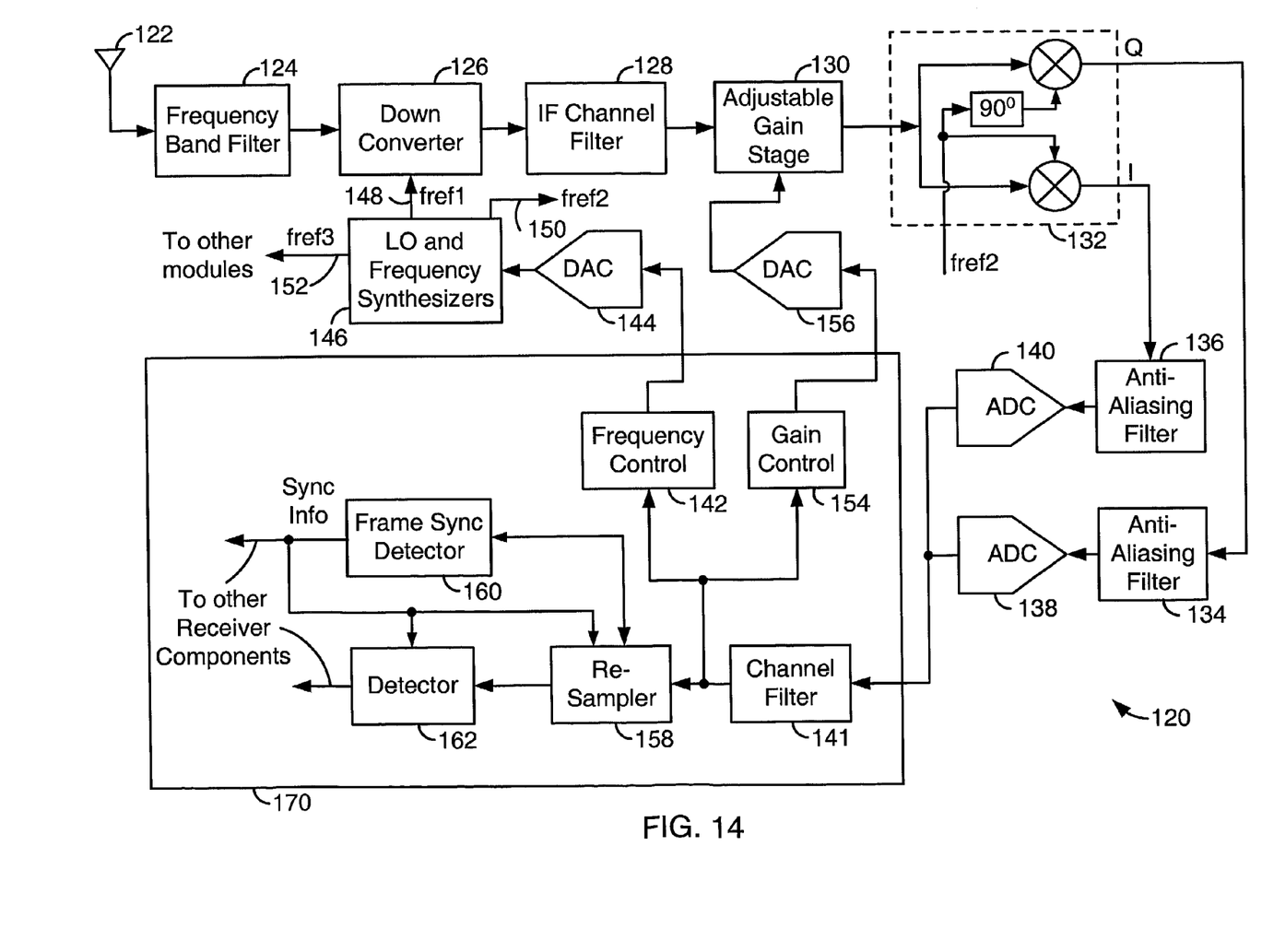
FIG. 14 is a detailed block diagram of a receiver in which the invention may be implemented.

FIG. 14 is a detailed block diagram of a receiver in which the invention may be implemented. The receiver 120 includes an antenna 122, the output of which is filtered in a frequency band filter 124. Down converter stage 126 converts the filtered signal from the filter 124 from a higher frequency to a lower frequency, typically from radio frequency (RF) to intermediate frequency (IF). IF channel filter 128 is a band pass filter that filters the down converted signal to select a particular IF channel in the down converted signal. Receiver 120 also includes an adjustable gain stage 130, which as known in the art can be controlled by a gain control signal generated by other receiver components described below.

A quadrature mixer 132 separates the in-phase (I) and quadrature (Q) components of the received signal. Low pass filters 134 and 136 filter out image signal components from the output of mixer 132 and limit the input bandwidth sampled by the ADCs 138 and 140. The ADCs 138 and 140 provide for signal processing functions in the digital domain, which is preferred for the instant invention.

Digital outputs from the ADCs 138 and 140 are input to a digital signal processor (DSP) 170. In the receiver 120, the I and Q components from ADCs 138 and 140 are input to channel filter 141 in DSP 170. The output from filter 141 is input to a frequency control unit 142, which generates a frequency control signal which in turn controls the local oscillator (LO) and frequency synthesizers generally designated 146 in FIG. 14 and a gain control unit 154, which generates a gain control signal for gain stage 130. DSP 170 is a digital component, whereas gain stages and frequency synthesizers normally use analog control signals. Digital to analog converters (DACs) 144 and 156 may therefore also be provided in the receiver 120. As shown, the LO and frequency synthesizers module 146 provides frequency reference signals fref1, fref2 and fref3 on its outputs 148, 150 and 152. In the example receiver 120, these reference signals are provided to the down converter 126, quadrature mixer 132 and other receiver modules.

The output signal from the channel filter 141 is also input to a re-sampler 158, which essentially realigns sample timings in accordance with synchronization information provided by frame sync detector 160. The FS detector 160 operates in accordance with the invention to detect FS patterns in received signals.

As discussed above, FS detector 160 detects a unique FS pattern or signal that is periodically inserted into a transmitted signal to maintain synchronization between a transmitter and receiver. In the Mobitex wireless communication system for example, the maximum length of a transmitted frame is about 1 second, so a Mobitex receiver should receive an FS pattern at least once every second. The frame sync detector 160 outputs synchronization information that may be used by other receiver components to maintain synchronization. In receiver 120, the re-sampler 158 includes a memory (not shown) which is accessed by the FS detector 160 in order to perform the rewind function. The DSP 170 in the example receiver 120 also includes a signal detector 162, the operation of which will be apparent to those skilled in the art. It should also be apparent that other receiver components that receive sync info from the FS detector 160 and/or received signal information from the detector 162 may include further DSP components, and/or components that are not implemented as part of the DSP 170. Although these other receiver components will differ for different receivers, many receivers include components to perform one or more of the operations of descrambling, deinterleaving, decoding, decryption, error checking and error correction. In addition, a microprocessor or software application in a communication device in which the receiver 120 is implemented may process data in a received signal.

Figure 15:
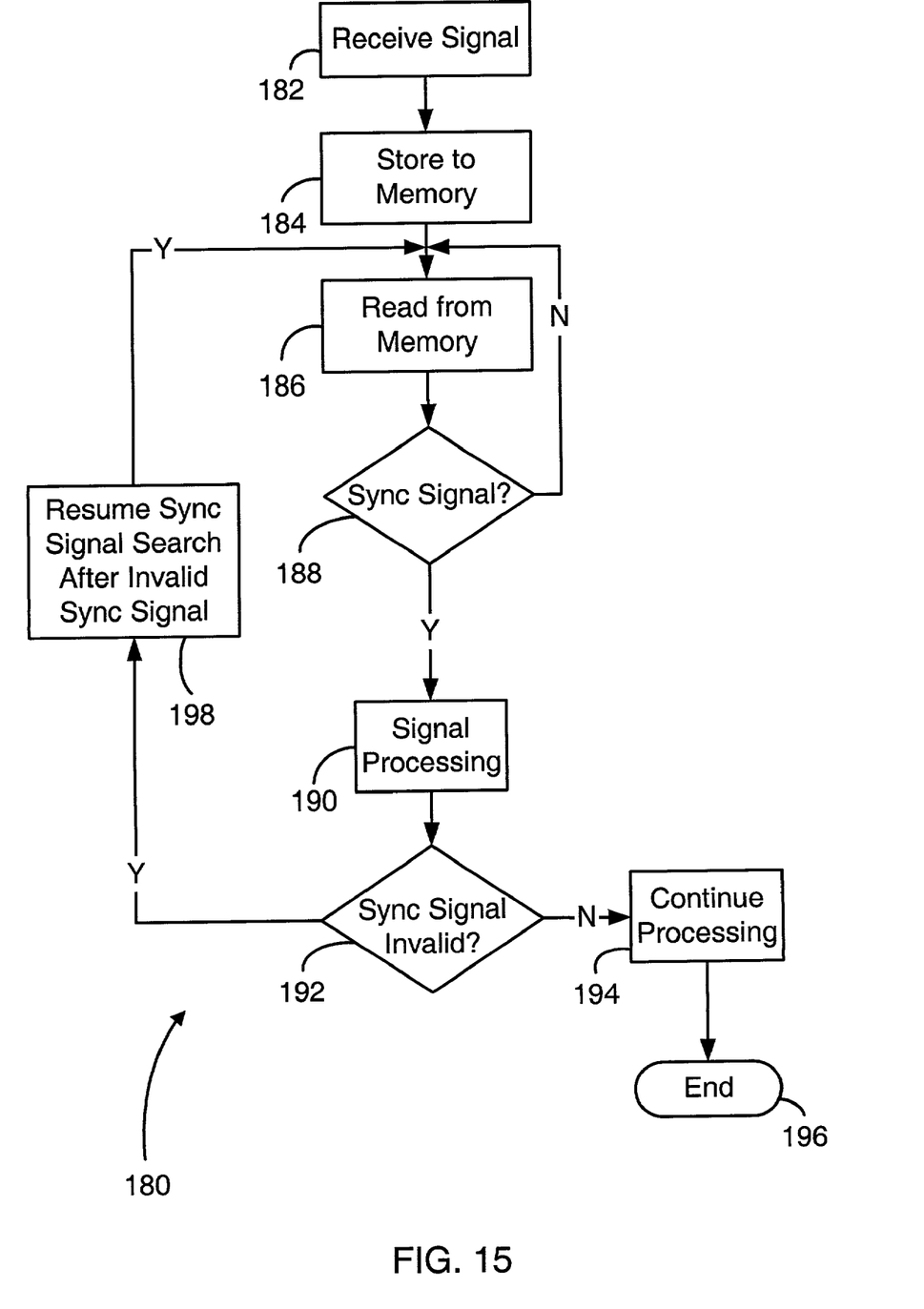
FIG. 15 is a flow diagram showing a sync signal detection method according to an embodiment of the invention.

FIG. 15 is a flow diagram showing a sync signal detection method according to an embodiment of the invention. The method 180 begins at step 182 when a signal is received. Portions of the received signal, or preferably digital samples thereof, are stored in a memory at step 184. At step 186, the samples are read from the memory by a sync signal detector. The sync signal detector then determines at step 188, through a correlation or other comparison process between the received signal and the known sync signal, whether or not a current portion of the received signal is the sync signal. As described above, a result of a correlation may be compared with a threshold to determine whether or not the sync signal has been detected. If the sync signal is not detected in the received signal, then step 186 is repeated. Where a sync signal is of a length that is greater than a portion of the received signal stored in a single memory location, then the sync signal detector may either read more than one location before performing the above comparison or sequentially compare the result of each memory read operation to a portion of the sync signal.

When the sync signal detector detects the sync signal at step 188, the receiver is synchronized and the method proceeds at step 190 with further processing of the received signal. Step 190 is analogous to the receiver decode state described above. After a further portion of the received signal has been processed, a determination of whether or not the detected sync signal is an invalid sync signal may be made, at step 192. For example, a frame head portion of the received signal may be decoded and a CRC performed on the decoded data, as described above. If the decoded data does not pass the CRC, then the detected sync signal may be declared invalid.

If the sync signal is not declared invalid, then processing of the received signal continues at steps 194 until an entire signal to be processed based on the detected sync signal, an entire frame of data for example, is processed. Once a negative determination is made at step 192, such that processing of a received signal proceeds at step 194, the sync signal detection method is complete and ends at step 196. If the sync signal is declared invalid, then the processing started at step 190 is discontinued and the sync signal detector resumes sync signal search operations at a point of the received signal just after the start of the previously detected invalid sync signal.

It should be apparent that the processing at steps 190 and 194 may be similar or different. For example, if a sync signal is declared invalid based on a BER or SER, then step 194 may be a continuation of the processing that began at step 190. Therefore, in the event that a detected sync signal is declared invalid, the method 180 may include a further step (not shown) of discontinuing processing of the received signal. Alternatively, if step 190 is frame head processing as described above, then step 194 may represent processing of frame data, such that when a sync signal is determined to be invalid, further processing of the received signal would not be executed. In this latter example, processing at step 190 is completed, and if a positive determination is made at step 192 is made then the further processing at step 194 is not executed, such that there may not necessarily be a step of discontinuing processing operations in all embodiments of the invention.

Although described primarily in the context of a particular receiver architecture, the invention may be applied to virtually any communication device in which sync pattern detection is required. Wireless modems such as those disclosed in U.S. Pat. No. 5,619,531,titled "Wireless Radio Modem with Minimal Interdevice RF Interference", issued on Apr. 8, 1997,and U.S. Pat. No. 5,764,693,titled "Wireless Radio Modem with Minimal Inter-Device RF Interference", issued on Jun. 9, 1998, both assigned to the assignee of the instant invention, represent types of communication devices in which the invention may be implemented. The disclosures of these patents are incorporated herein by reference. Many conventional wired modems also require sync pattern detection and therefore would be suitable for application of the invention.

In further preferred embodiments, the invention may be configured to operate in conjunction with mobile communication devices, such as those disclosed in U.S. Pat. No. 6,278,442, issued on Aug. 21, 2001, and entitled "Hand-Held Electronic Device With a Keyboard Optimized for Use With the Thumbs", the disclosure of which is incorporated into this description by reference. Other systems and devices in which the invention may be implemented include, but are not limited to, further fixed or mobile communication systems, hand-held communication devices, personal digital assistants (PDAs) with communication functions, cellular telephones and one-way or two-way pagers.

It will be appreciated that the above description relates to preferred embodiments by way of example only. Many other variations of the invention will be obvious to those knowledgeable in the field, and such obvious variations are within the scope of the invention as described and claimed, whether or not expressly described.

For example, the receiver 120 represents an illustrative embodiment of instant invention. Practical implementation of the invention is in no way restricted thereto. The invention is applicable to both wired and wireless receivers, which may or may not include all of the functional blocks shown in FIG. 14. Similarly, receivers or communication devices in which the invention is implemented may also include further functions and components in addition to those disclosed above. In many contemplated embodiments, a receiver embodying sync pattern detection in accordance with the invention would be a part of a two-way communication device which would also include a transmitter.

What is claimed as the invention is:

1. A system for detecting a synchronization (sync) signal in a received communication signal, comprising:
    a memory configured to store consecutive portions of the received communication signal; and
    a sync signal detector configured to read the stored consecutive portions of the received communication signal from the memory, monitor the read stored consecutive portions of the received signal to detect the sync signal, and determine whether or not the detected sync signal in the read stored consecutive portions of the received communications signal is invalid, wherein the sync signal detector reads from the memory and monitors previously read and monitored stored consecutive portions of the received communications signal occurring after the detected sync signal when the detected sync signal is invalid to detect as the sync signal a valid sync signal.

2. The system of claim 1, further comprising a signal processor configured to read and process stored consecutive portions of the received communication signal which are stored in the memory following the detected sync signal.

3. The system of claim 2, wherein the sync signal detector is configured to monitor an output signal from the signal processor to determine if the detected sync signal is invalid.

4. The system of claim 3, wherein the sync signal detector monitors an error rate of the output signal of the signal processor and determines that the detected sync signal is invalid if the error rate exceeds a threshold.

5. The system of claim 2, wherein processing operations of the signal processor are discontinued when the sync signal detector determines that the detected sync signal is invalid.

6. The system of claim 2, wherein:
the received communication signal comprises a plurality of frames; and
the sync signal is a frame synchronization signal.

7. The system of claim 6, wherein:
each of the plurality of frames comprises a frame head and frame data;
the signal processor reads and processes the frame head when a sync signal is detected by the sync signal detector; and
the signal processor reads and processes the frame data only if the sync signal detector determines that the detected sync signal is not invalid.

8. The system of claim 1, wherein:
the received communication signal is an analog signal; and
the stored consecutive portions of the received communication signal are digital samples of the received communication signal.

9. The system of claim 1, wherein the memory and the sync signal detector are implemented in a digital signal processor (DSP).

10. The system of claim 1, implemented in a communication device selected from the group consisting of: modems, mobile communication systems, hand-held communication devices, personal digital assistants (PDAs) with communication functions, cellular telephones, one-way pagers and two-way pagers.

11. A method for detecting a synchronization (sync) signal in a received communication signal, comprising the steps of:
storing consecutive portions of the received communication signal in a memory;
reading the stored consecutive portions of the received communication signal from the memory;
monitoring the read stored consecutive portions of the received signal to detect the sync signal;
determining whether or not the detected sync signal in the read stored consecutive portions of the received communications signal is invalid; and
if the detected sync signal is invalid, then repeating the steps of reading and monitoring for previously read and monitored stored consecutive portions of the received communications signal occurring after the detected sync signal to detect as the sync signal a valid sync signal.

12. The method of claim 11, further comprising the steps of reading and processing, based on the detected sync signal, stored consecutive portions of the received communication signal which are stored in the memory following the detected sync signal.

13. The method of claim 12, wherein the step of determining comprises the steps of:
monitoring a resultant processed signal from the step of processing to determine an error rate of the processed signal;
determining that the detected sync signal is invalid if the error rate exceeds a threshold; and
discontinuing the step of processing when the detected sync signal is invalid.

14. The method of claim 12, wherein:
the received communication signal comprises a plurality of frames, each comprising a frame head and frame data;
the steps of reading and processing comprise reading and processing the frame head when the sync signal is detected; and
the method further comprises the steps of, if the detected sync signal is not invalid, reading and processing the frame data.

15. The method of claim 14, wherein:
the received communication signal is an analog signal; and
the stored consecutive portions of the received communication signal are digital samples representative of the received communication signal;
the sync signal has a length of k samples.

16. A system for detecting a synchronization (sync) signal in a received communication signal, comprising:
means for storing consecutive portions of the received communication signal; and
means for detecting the sync signal, by reading the stored consecutive portions of the received communication signal from the means for storing, monitoring the read stored consecutive portions of the received communications signal to detect the sync signal, and determining whether or not the detected sync signal in the read stored consecutive portions of the received communications signal is invalid, wherein the means for detecting reads from the memory and monitors previously read and monitored stored consecutive portions of the received signal occurring after the detected sync signal when the detected sync signal is invalid to detect as the sync signal a valid sync signal.

17. A computer readable medium containing instructions for implementing a method for detecting a synchronization (sync) signal in a received communication signal, the method comprising the steps of:
storing consecutive portions of the received communication signal in a memory;
reading the stored consecutive portions of the received communication signal from the memory;
monitoring the read stored consecutive portions of the received signal to detect the sync signal;
determining whether or not the detected sync signal in the read stored consecutive portions of the received communications signal is invalid; and
if the detected sync signal is invalid, then repeating the steps of reading and monitoring for previously read and monitored stored consecutive portions of the received communications signal occurring after the detected sync signal to detect as the sync signal a valid sync signal.

18. The medium of claim 17, implemented in a digital signal processor (DSP).

19. A wireless communication device comprising:
a transceiver configured to transmit and receive communication signals; and
a digital signal processor (DSP) operatively coupled to the transceiver, the DSP comprising computer software code for detecting a synchronization (sync) signal in a received communication signal, by performing the functions of:
storing consecutive portions of the received communication signal in a memory;
reading the stored consecutive portions of the received communication signal from the memory;

monitoring the read stored consecutive portions of the received signal to detect the sync signal;

determining whether or not the detected sync signal in the read stored consecutive portions of the received communications signal is invalid; and if the detected sync signal is invalid, then repeating the steps of reading and monitoring for previously read and monitored stored consecutive portions of the received communications signal occurring after the detected sync signal to detect as the sync signal a valid sync signal.

20. The device of claim 19, wherein the transceiver is configured to receive analog communication signals and convert the received analog signals to digital signal samples for storage in the memory.

21. The device of claim 19, wherein:

the transceiver comprises a communication signal receiver;

the receiver has two modes of operation, the two modes of operation comprising a sync signal search mode in which the computer software code for detecting a sync signal is executed and a signal decode mode in which a received signal is processed; and the receiver remains in the sync signal search mode until the sync signal is detected, enters the decode mode when the sync signal is detected, and reverts to the sync signal search mode if the detected sync signal is determined to be invalid.

22. The device of claim 21, wherein the receiver reverts to the sync signal search mode from the decode mode when a predetermined portion of the received communications signal has been processed.

23. The wireless communications device of claim 19, wherein the device is selected from the group consisting of wireless modems, hand-held communication devices, personal digital assistants (PDAs) with communication functions, cellular telephones, one-way pagers and two-way pagers.

* * * * *